United States Patent
Mourrier

(10) Patent No.: US 8,698,440 B2
(45) Date of Patent: Apr. 15, 2014

(54) LOW FREQUENCY DRIVE CONTROL CIRCUIT AND METHOD FOR DRIVING AN INDUCTIVE LOAD

(75) Inventor: Andre Mourrier, Manosque (FR)

(73) Assignee: International Rectifier Corporation, El Segundo, CA (US)

( * ) Notice: Subject to any disclaimer, the term of this patent is extended or adjusted under 35 U.S.C. 154(b) by 569 days.

(21) Appl. No.: 12/799,555

(22) Filed: Apr. 27, 2010

(65) Prior Publication Data

US 2011/0260668 A1    Oct. 27, 2011

(51) Int. Cl.
*H02P 1/30* (2006.01)
*H02P 1/52* (2006.01)
*H02P 3/00* (2006.01)

(52) U.S. Cl.
USPC ....... 318/503; 318/400.06; 327/232; 327/236

(58) Field of Classification Search
USPC ................. 318/503, 400.06; 327/232, 236
See application file for complete search history.

(56) References Cited

U.S. PATENT DOCUMENTS

| | | | |
|---|---|---|---|
| 5,706,186 A * | 1/1998 | Blasko | 363/41 |
| 6,674,962 B2 | 1/2004 | Nadeau | |
| 7,012,393 B2 * | 3/2006 | De Frutos et al. | 318/434 |
| 8,102,167 B2 * | 1/2012 | Irissou et al. | 323/300 |
| 2004/0178746 A1 * | 9/2004 | Nemirow | 315/291 |
| 2005/0248327 A1 * | 11/2005 | Kogel et al. | 323/282 |
| 2010/0190492 A1 * | 7/2010 | Jiang | 455/432.1 |

FOREIGN PATENT DOCUMENTS

JP        8-126374       5/1996

* cited by examiner

*Primary Examiner* — Erick Glass
(74) *Attorney, Agent, or Firm* — Farjami & Farjami LLP

(57) ABSTRACT

According to one embodiment, a low frequency drive control circuit for use with an inductive load comprises a comparator configured to receive a high frequency signal at a first input and a smoothly varying low frequency signal for modulating the high frequency signal at a second input. The comparator is further configured to produce a pulse width modulated output of the low frequency drive control circuit for use in generating a smoothly varying low frequency load current in the inductive load. In one embodiment, the inductive load can comprise a DC brushed motor. In one embodiment, the low frequency drive control circuit can be implemented as part of an integrated circuit further comprising a switching circuit configured to use the pulse width modulated output of the comparator to generate the smoothly varying low frequency load current, which may be a substantially sinusoidal load current, for example.

19 Claims, 5 Drawing Sheets

LOW FREQUENCY DRIVE CONTROL CIRCUIT AND METHOD FOR DRIVING AN INDUCTIVE LOAD

BACKGROUND OF THE INVENTION

1. Field of the Invention

The present invention is generally in the field of electrical circuits and systems. More specifically, the present invention is in the field of circuits and systems for use in driving inductive loads.

2. Background Art

Inductive loads, such as electric motors, pumps, fans, and the like, are typically driven at high frequencies to avoid the drawbacks associated with use of conventional low frequency drivers. For example, driving an inductive load, such as a brushed direct current (DC) motor, at low frequency can give rise to undesirable mechanical vibrations and acoustic noise. Despite their success in driving inductive loads without producing substantial vibrations or acoustic noise, conventional approaches to using high frequency drivers are associated with significant disadvantages as well. For instance, use of a high frequency driver to drive a DC brushed motor can be inefficient due to substantial power losses, such as switching losses in the power semiconductor devices implemented to provide the motor drive current, for example.

Historically, sacrificing operating efficiency for smooth and largely noise free motor performance has been considered an acceptable tradeoff. However, as the goal of reducing power consumption, especially in the form of unnecessary power losses, becomes an increasingly important and even mandated design objective, the reductions in switching losses achievable through use of low frequency drivers has become more compelling.

One known approach to using a low frequency driver to drive a DC brushed motor uses metal-oxide-semiconductor field-effect transistor (MOSFET) power switches to drive the motor, and operates those MOSFET power switches in linear mode. By successfully reducing the abruptness of the switching transition through linear operation of the MOSFET power switches, this approach has achieved considerable success in driving a DC brushed motor, or other inductive load, at low frequency, while also reducing mechanical vibrations and acoustic noise. However, operating MOSFET power devices in linear mode is itself quite inefficient, and the described approach yields little or none of the power saving advantages typically associated with use of a low frequency driver.

Thus, there is a need to overcome the drawbacks and deficiencies in the art by providing a drive control circuit configured to enable low power loss operation of a coupled switching circuit while concurrently reducing or eliminating mechanical vibrations and acoustic noise in an inductive load driven by the switching circuit.

SUMMARY OF THE INVENTION

A low frequency drive control circuit and method for driving an inductive load, substantially as shown in and/or described in connection with at least one of the figures, as set forth more completely in the claims.

DETAILED DESCRIPTION OF THE INVENTION

Figure 1:
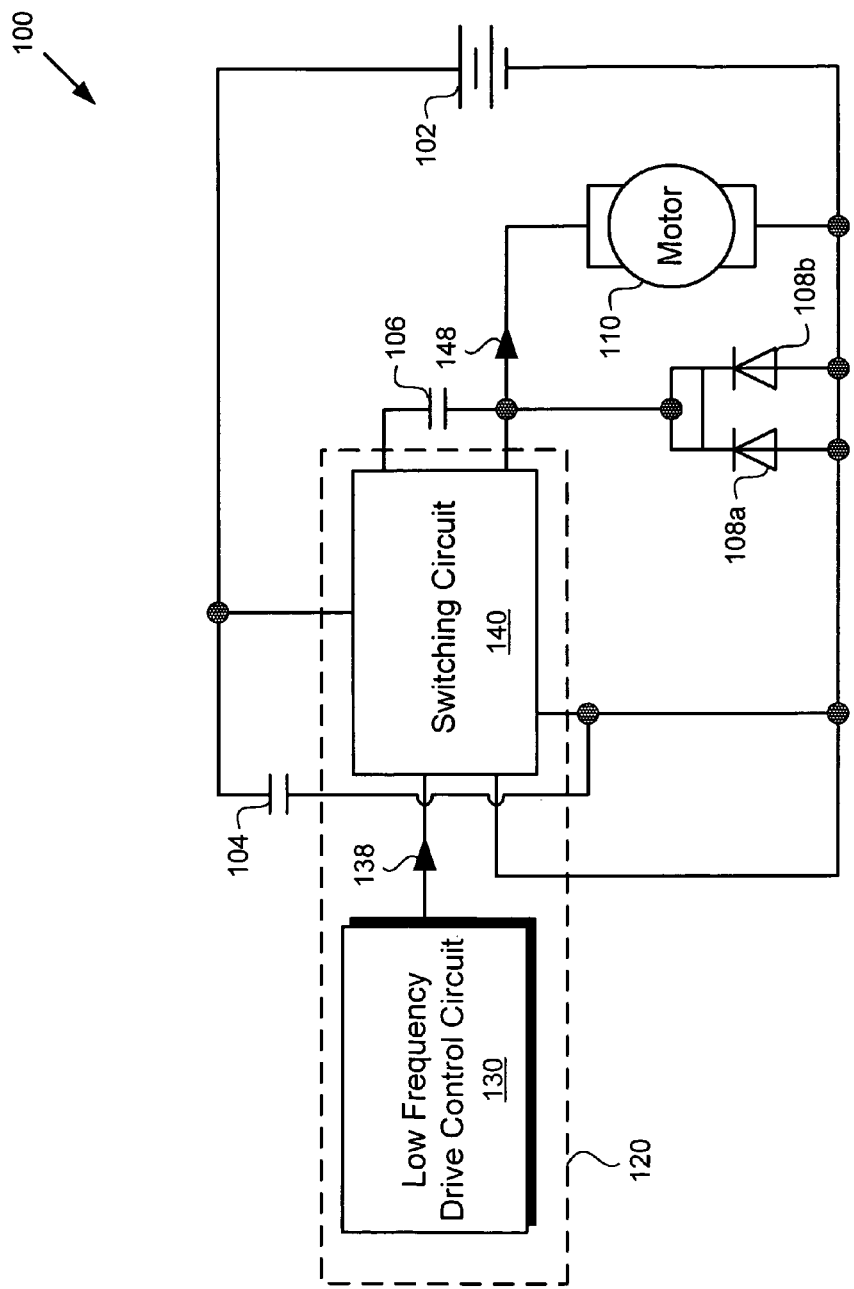
FIG. 1 is a block diagram showing various features of a system for driving an inductive load at low frequency, including a low frequency drive control circuit, according to one embodiment of the present invention.

The present invention is directed to a low frequency drive control circuit and method for driving an inductive load. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a block diagram showing selected features of system 100 for driving an inductive load at low frequency, including low frequency drive control circuit 130, according to one embodiment of the present invention. As shown in FIG. 1, system 100 includes battery 102, input filter capacitor 104, bootstrap capacitor 106, diodes 108a and 108b, and motor 110 driven by low frequency driver integrated circuit (IC) 120 including low frequency drive control circuit 130 and switching circuit 140. Also shown in FIG. 1 are low frequency drive control circuit output 138 and motor current 148 provided by switching circuit 140.

By way of example, in one embodiment, system 100 may be implemented in an automobile. For example, battery 102 may comprise a 14 volt automotive battery, and motor 110 may comprise any one of the approximately fifty or more direct current (DC) brushed motor devices with which automobiles are now commonly equipped. For instance, motor 110 may correspond to a DC brushed motor driven cooling fan, water pump, or fuel system regulator, configured to provide up to approximately 650 W of power, for example.

It is noted that although the embodiment of FIG. 1 will be described in terms of a motor, such as the automobile implemented DC brushed motor described above, that representation is merely provided as exemplary of the present inventive concepts. For instance, motor 110 may be seen to correspond more generally to any appropriate inductive load. Moreover, although as shown in FIG. 1, low frequency drive control circuit 130 and switching circuit 140 may be implemented together as part of low frequency driver IC 120 in some embodiments, e.g., they may be formed on a common semiconductor die, in other embodiments, low frequency drive control circuit 130 and switching circuit 140 may be implemented as separate circuits, and may each comprise distinct ICs, for example.

Low frequency driver IC 120 including low frequency driver control circuit 130 is capable of overcoming the drawbacks and deficiencies of conventional approaches to driving an inductive load, by delivering the advantages of low power consumption typically attributed to low frequency drive approaches, while concurrently delivering the advantages of reduced mechanical vibration and reduced acoustic noise typically attributed to high frequency drivers. As will be more fully explained below, low frequency drive control circuit 130 utilizes a smoothly varying low frequency signal to modulate a high frequency signal, and produces a pulse width modulated output as output 138. Pulse width modulated low frequency drive control circuit output 138 is then provided to switching circuit 140, which may be a high frequency high side switch, for example, as known in the art. Pulse width modulated low frequency drive control circuit output 138 can then be used as a switching control signal by switching circuit 140, to generate motor current 148, which in the present embodiment will comprise a smoothly varying, substantially sinusoidal, low frequency motor current.

Figure 2:
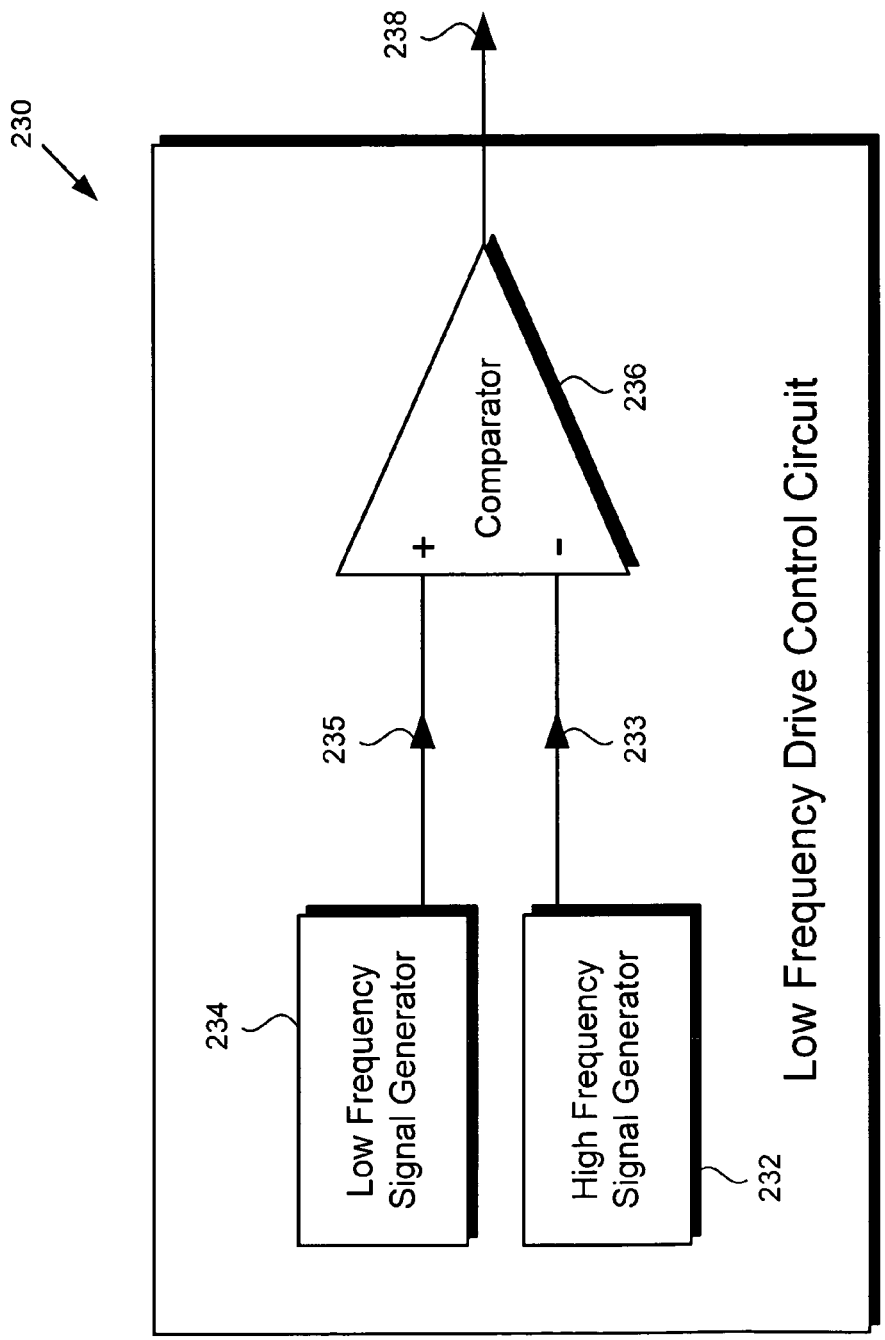
FIG. 2 is a conceptual block diagram showing a more detailed representation of a low frequency drive control circuit, according to one embodiment of the present invention.

Turning to FIG. 2, FIG. 2 is a conceptual block diagram showing a more detailed representation of low frequency drive control circuit 230, according to one embodiment of the present invention. Low frequency drive control circuit 230 providing output 238 corresponds to low frequency drive control circuit 130 providing output 138, in FIG. 1. As shown in FIG. 2, low frequency drive control circuit 230 may comprise high frequency signal generator 232 providing high frequency signal 233 to a negative input of comparator 236. As further shown in FIG. 2, low frequency drive control circuit 230 may also comprises low frequency signal generator 234 providing low frequency signal 235 to a positive input of comparator 236.

Figure 3:
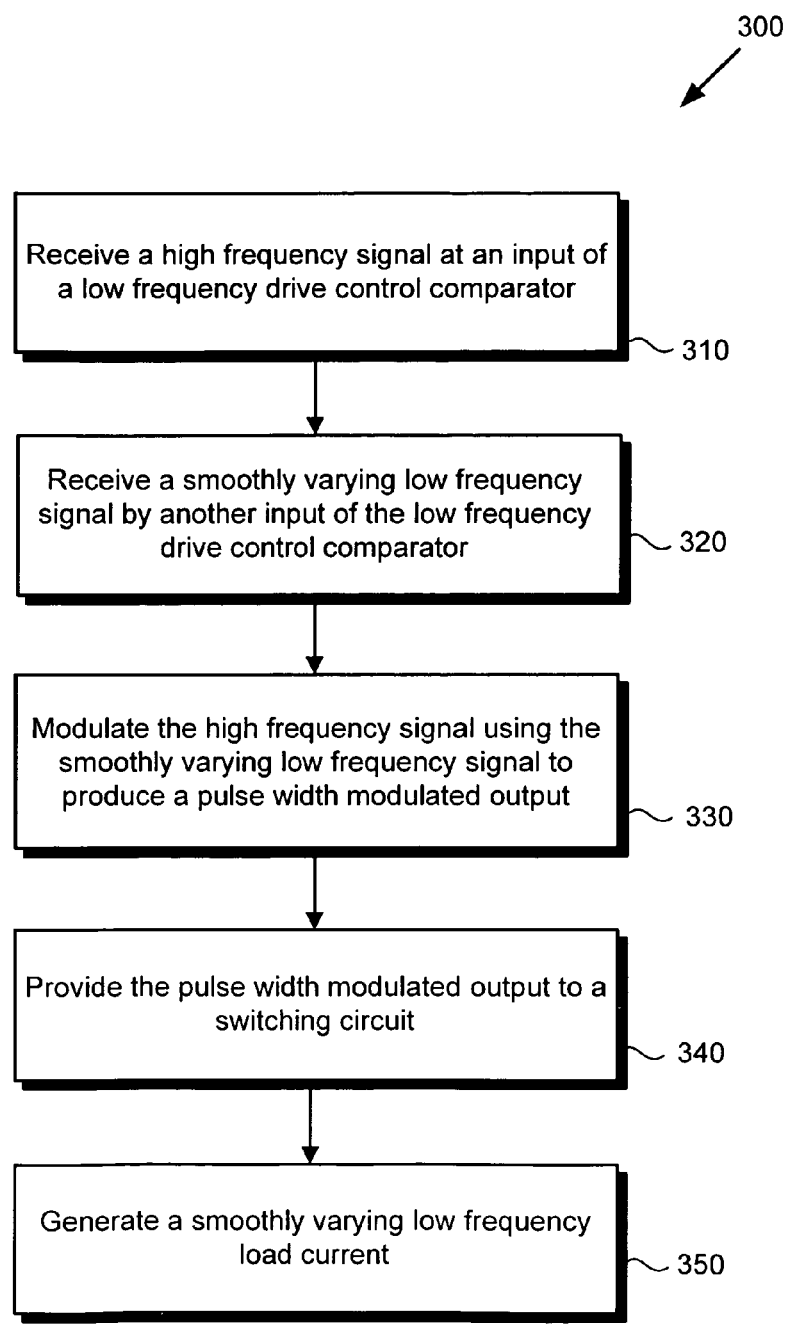
FIG. 3 shows a flowchart presenting a method for driving an inductive load at low frequency, according to one embodiment of the present invention.

The operation of system 100, in FIG. 1, and low frequency drive control circuit 230, in FIG. 2, will be further described in combination with FIGS. 3, 4A, 4B, 4C, and 4D. FIG. 3 shows a flowchart presenting a method for driving an inductive load at low frequency, according to one embodiment of the present invention, while FIGS. 4A, 4B, 4C, and 4D, depict graphical representations of signals 433, 435, 438, and 448, corresponding respectively high frequency signal 233, low frequency signal 235, and output 238, in FIG. 2, and motor current 148, in FIG. 1.

Referring to FIG. 3, FIG. 3 presents flowchart 300 describing one embodiment of a method for driving an inductive load, such as motor 110, in FIG. 1, at low frequency. Certain details and features have been left out of flowchart 300 that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300, or may comprise more, or fewer, steps.

Figure 4A:
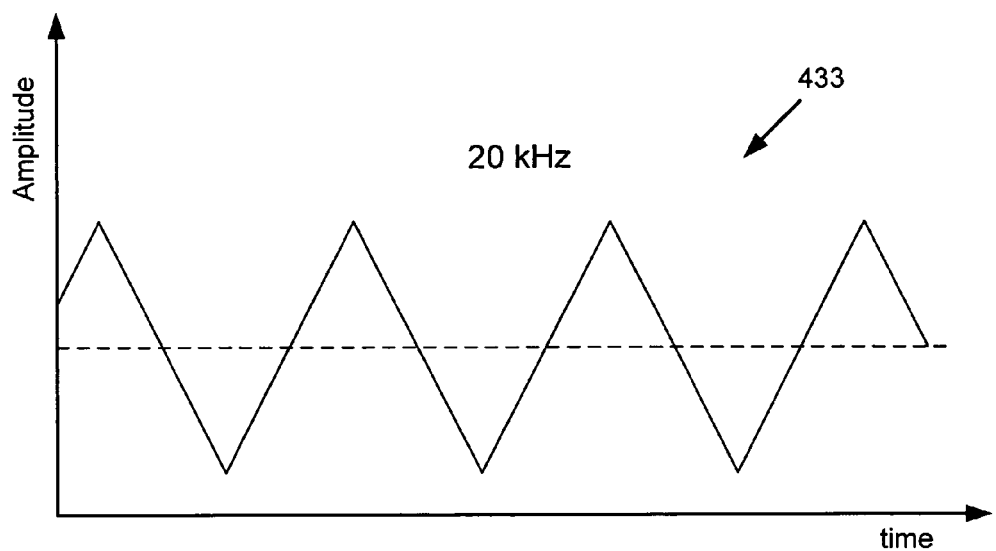
FIG. 4A is a graph showing a high frequency signal suitable for use by a low frequency drive control circuit, according to one embodiment of the present invention.

Step 310 of flowchart 300 comprises receiving a high frequency signal at an input of a low frequency drive control comparator. Referring to low frequency drive control circuit 230, in FIG. 2, step 310 of flowchart 300 may be seen to correspond to comparator 236 receiving high frequency signal 233 from high frequency signal generator 232 at the negative input of comparator 236. Referring to FIG. 4A, FIG. 4A is a graph showing high frequency signal 433 suitable for use by low frequency drive control circuit 230, according to one embodiment of the present invention. As shown in FIG. 4A, high frequency signal 433 may correspond to a triangle wave with a frequency of 20 kHz, for example.

Figure 4B:
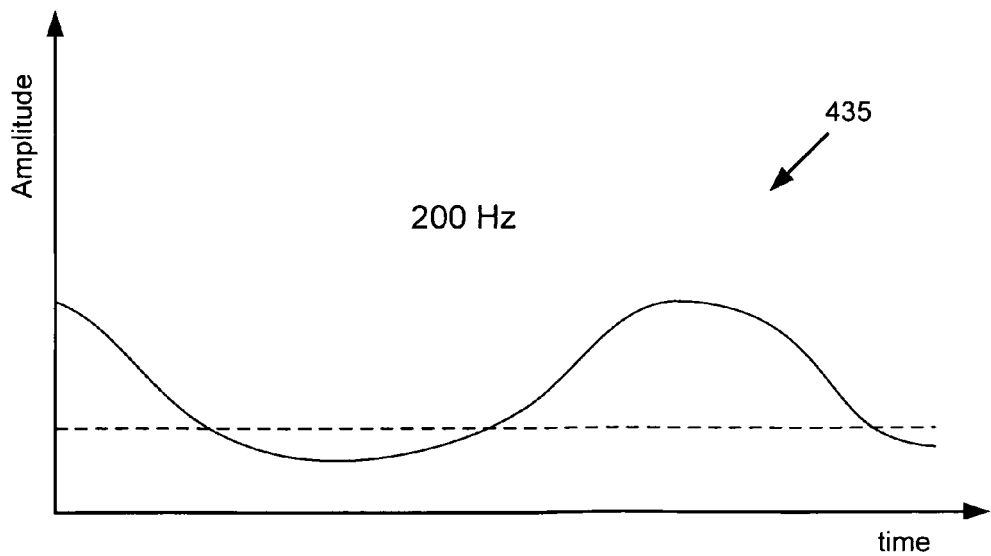
FIG. 4B is a graph showing a smoothly varying low frequency signal suitable for use by a low frequency drive control circuit, according to one embodiment of the present invention.

Continuing with step 320, in FIG. 3, step 320 of flowchart 300 comprises receiving a smoothly varying low frequency signal, e.g., low frequency signal 235, at another input of low frequency drive control circuit comparator 236. Referring again to low frequency drive control circuit 230, in FIG. 2, step 320 of flowchart 300 may be seen to correspond to comparator 236 receiving low frequency signal 235 from low frequency signal generator 234 at the positive input of comparator 236. Referring now to FIG. 4B, FIG. 4B is a graph showing smoothly varying low frequency signal 435 suitable for use by low frequency drive control circuit 230, according to one embodiment of the present invention. As shown in FIG. 4B, smoothly varying low frequency signal 435 may correspond to an "S" shaped periodic signal with a frequency of 200 Hz, for example.

Smoothly varying low frequency signal 435 is a modulation signal having characteristics such that its modulation of high frequency signal 433 produces a pulse width modulated output of low frequency drive control circuit 230, that when used to control switching circuit 140, in FIG. 1, results in generation of smoothly varying low frequency motor current 148 for driving motor 110. Consequently, the precise shape and frequency of smoothly varying low frequency signal 435 that may be optimal for a particular implementation can vary, for example, according to the characteristics of switching circuit 140, as well as other variable parameters of system 100. However, in so far as the shape and frequency of smoothly varying low frequency signal 435 can be readily tuned through simple adjustment of low frequency signal generator 234, in FIG. 2, the experimentation required to optimize smoothly varying low frequency signal 435 for a given implementation of system 100 can be nominal. Thus, low frequency signal 235/435 may be best characterized as a smoothly varying "S" shaped signal having a frequency of less than or equal to approximately 500 Hz, such as 200 Hz, as shown in FIG. 4B, or such as 10 Hz or 5 Hz in other embodiments, for example.

It is noted that although the embodiment of FIG. 2 shows low frequency drive control circuit 230 as comprising both high frequency signal generator 232 and low frequency signal generator 234, that representation should not be interpreted as definitive. In other embodiments, one or both of high frequency signal generator 232 and low frequency signal generator 234 may be external to low frequency drive control circuit 130, and may be implemented on-chip, e.g., as separate components of low frequency driver IC 120, or be implemented as off-chip components of system 100. In those latter embodiments, comparator 236 can be configured to receive one or both of high frequency signal 233 and low frequency signal 235 as inputs to low frequency drive control circuit 230.

Figure 4C:
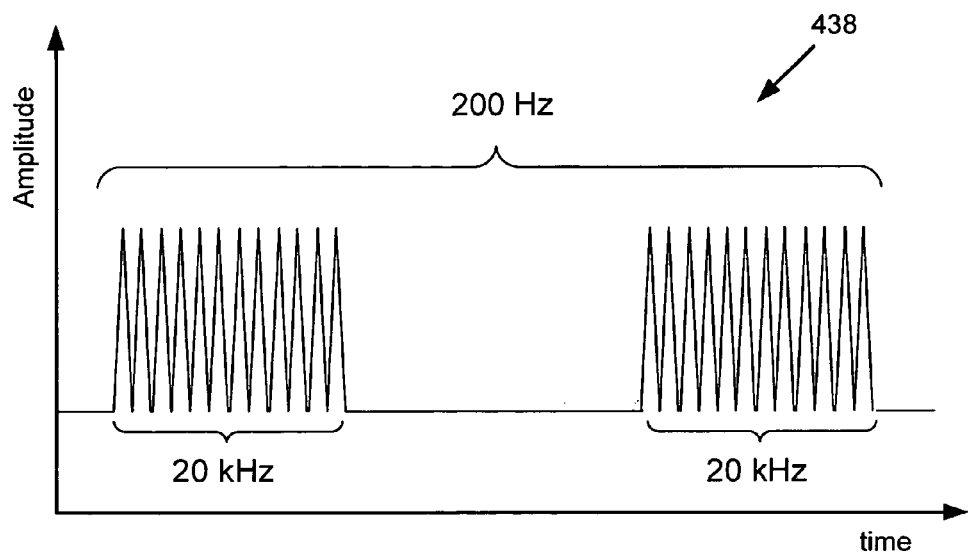
FIG. 4C is a graph showing a pulse width modulated output of a low frequency drive control circuit, according to one embodiment of the present invention.

Moving on to step 330 of FIG. 3, step 330 of flowchart 300 comprises modulating the high frequency signal using the smoothly varying low frequency signal to produce a pulse width modulated output. Referring once again to low frequency drive control circuit 230, in FIG. 2, step 330 of flowchart 300 corresponds to modulation of high frequency signal 233 using low frequency signal 235 to produce output 238 of low frequency drive control circuit 230. Referring to FIG. 4C, FIG. 4C is a graph showing a pulse width modulated output of a low frequency drive control circuit, according to one embodiment of the present invention.

Pulse width modulated output 438 corresponds to a signal of low frequency pulses, wherein each pulse comprises a plurality of high frequency signal variations. As shown in FIG. 4C, the present embodiment shows pulse width modulated output 438 as comprising 20 kHz high frequency signal 433 modulated by 200 Hz smoothly varying low frequency signal 435 to produce a signal having approximately 200 Hz pulses, each pulse including a sequence of approximately 20 kHz oscillations.

Continuing with step 340 of flowchart 300, step 340 comprises providing the pulse width modulated output produced in step 330 to a switching circuit. As shown by reference to FIG. 4C and FIG. 1, for example, step 340 of flowchart 300 may correspond to providing pulse width modulated output 438, in FIG. 4C, to switching circuit 140, in FIG. 1, as low frequency drive control circuit output 138.

Figure 4D:
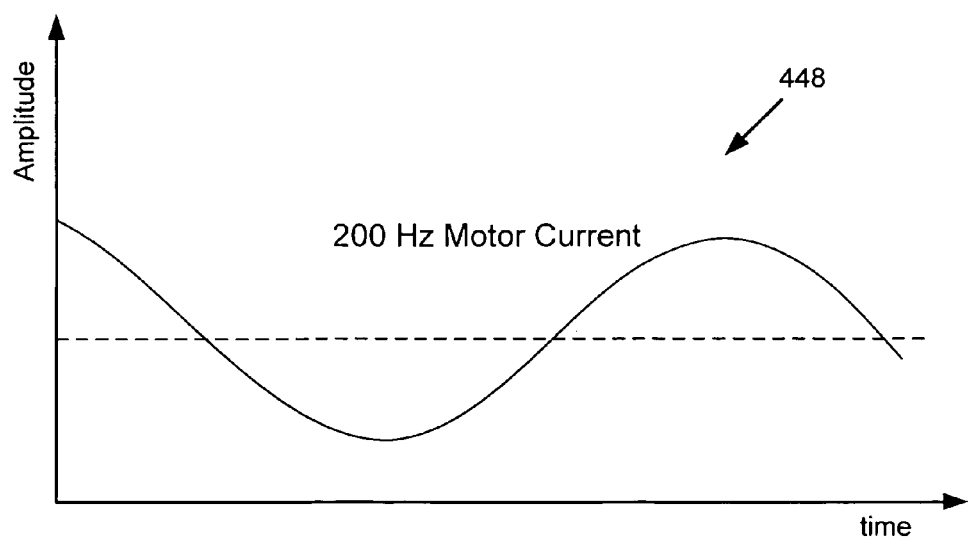
FIG. 4D is a graph showing a smoothly varying low frequency load current, produced according to one embodiment of the present invention.

Step 350 of flowchart 300 comprises generating a smoothly varying low frequency load current. Referring to FIGS. 1, 4C, and 4D, step 350 may be performed by switching circuit 140 using pulse width modulated output 438 of low frequency drive control circuit 130 as a control signal, to generate smoothly varying low frequency motor current 448 for driving motor 110. As shown in FIG. 4D, according to the present embodiment, in which pulse width modulated output 438 is used to control switching circuit 140, smoothly varying low frequency motor current 448 generated by switching circuit 140 of low frequency driver IC 120 is a substantially sinusoidal, approximately 200 Hz, drive current.

Use of the circuits and methods disclosed by the present application can provide substantial advantages over conventional approaches to driving inductive loads. For example, when system 100 including low frequency drive control circuit 130 is implemented using known high frequency high side switch circuitry as switching circuit 140, significant cost and power saving can be achieved. When compared to a high frequency driver system utilizing a comparable high frequency high side switch as switching circuit 140, for example, the embodiment of FIG. 1 can save approximately 50% of the switching loss on the high side switch. The implementation of FIG. 1 can also yield an approximately 35% power savings in diodes 108a and 108b.

In addition, implementation of system 100 can result in reduction of the current in input filter capacitor 104 of approximately 20% when compared to a high frequency driver system utilizing a comparable high frequency high side switch as switching circuit 140. As a result, the size of input filter capacitor 104 can be reduced by approximately 20%, resulting in significant cost savings. Overall, embodiments of the present invention can reduce total power loss by approximately 50% compared to conventional high frequency driver systems, enabling a corresponding reduction in the size of the heatsink required for switching circuit 140.

Thus, by utilizing a smoothly varying low frequency signal to modulate a high frequency signal, embodiments of the present low frequency drive control circuit are configured to produce a pulse width modulated output for use in driving an inductive load at low frequency, resulting in substantial power savings over high frequency driven systems. Moreover, by providing the pulse width modulated output to a switching circuit configured to use that pulse width modulated output signal to generate a smoothly varying low frequency load current for driving the inductive load, embodiments of the present invention enable the aforementioned power and cost savings without incurring the disadvantages of significant mechanical vibration and acoustic noise plaguing conventional low frequency driver systems.

From the above description of the invention it is manifest that various techniques can be used for implementing the concepts of the present invention without departing to from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A low frequency drive control circuit for use with an inductive load, said low frequency drive control circuit comprising:
   a comparator configured to receive a high frequency signal at a first input and a low frequency signal for modulating said high frequency signal at a second input;
   said comparator further configured to produce a pulse width modulated output of said low frequency drive control circuit for use in generating a low frequency load current in said inductive load;
   wherein said comparator is configured to produce a signal of low frequency pulses as said pulse width modulated output, each of said low frequency pulses including a plurality of high frequency signal variations.

2. The low frequency drive control circuit of claim 1, further comprising a low frequency signal generator for generating said low frequency signal.

3. The low frequency drive control circuit of claim 1, further comprising a high frequency signal generator for generating said high frequency signal.

4. The low frequency drive control circuit of claim 1, wherein said low frequency signal comprises a signal frequency of less than or equal to approximately 500 Hz.

5. The low frequency drive control circuit of claim 1, wherein said high frequency signal comprises a signal frequency of approximately 20 kHz.

6. The low frequency drive control circuit of claim 1, wherein said pulse width modulated output of said low frequency drive control circuit is provided to a switching circuit configured to generate said low frequency load current.

7. The low frequency drive control circuit of claim wherein said inductive load comprises a DC brushed motor.

8. A low frequency driver integrated circuit (IC) comprising:
   a switching circuit of said low frequency driver IC coupled to a low frequency drive control circuit of said low frequency driver IC;
   said low frequency drive control circuit configured for use with an inductive load and comprising:
      a comparator configured to receive a high frequency signal at a first input and a low frequency signal for modulating said high frequency signal at a second input;
      said comparator further configured to provide a pulse width modulated output of said low frequency drive control circuit to said switching circuit for use in generating a low frequency load current in said inductive load.

9. The low frequency driver IC of claim 8, further comprising a low frequency signal generator for generating said low frequency signal.

10. The low frequency driver IC of claim 8, further comprising a high frequency signal generator for generating said high frequency signal.

11. The low frequency driver IC of claim 8, wherein said low frequency signal comprises a signal frequency of less than or equal to approximately 500 Hz.

12. The low frequency driver IC of claim 8, wherein said high frequency signal comprises a signal frequency of approximately 20 kHz.

13. The low frequency driver IC of claim 8, wherein said inductive load comprises a DC brushed motor.

14. A method for driving an inductive load at low frequency, said method comprising:
receiving a high frequency signal;
receiving a low frequency signal;
modulating said high frequency signal using said low frequency signal to produce a pulse width modulated output for use in generating a low frequency load current in said inductive load;
wherein said pulse width modulated output is a signal of low frequency pulses, each of said low frequency pulses including a plurality of high frequency signal variations.

15. The method of claim 14, further comprising generating at least one of said low frequency signal and said high frequency signal.

16. The method of claim 14, wherein said low frequency signal comprises a signal frequency of less than or equal to approximately 500 Hz.

17. The method of claim 14, wherein said high frequency signal comprises a signal frequency of approximately 20 kHz.

18. The method of claim 14, further comprising providing said pulse width modulated output to a switching circuit configured to generate said low frequency load current.

19. The method of claim 14, wherein said inductive load comprises a DC brushed motor.

* * * * *